Figure 1:
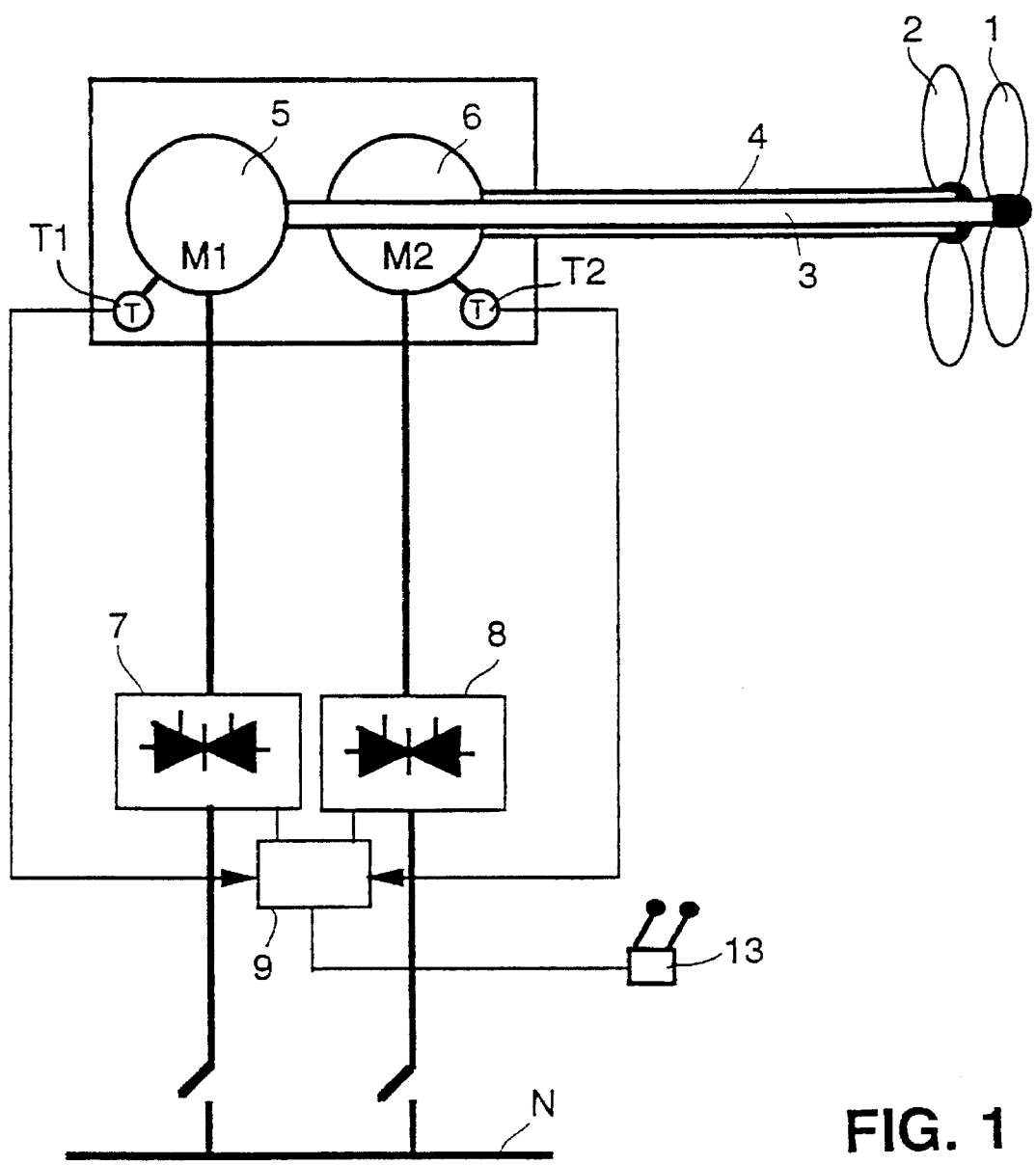

United States Patent
Järvinen

Patent Number: 5,599,215
Date of Patent: Feb. 4, 1997

[54] PROPELLER DRIVE SYSTEM

[75] Inventor: Kauko Järvinen, Helsinki, Finland

[73] Assignee: ABB Industry Oy, Helsinki, Finland

[21] Appl. No.: 454,218

[22] PCT Filed: Dec. 22, 1993

[86] PCT No.: PCT/FI93/00553

§ 371 Date: Sep. 20, 1995

§ 102(e) Date: Sep. 20, 1995

[87] PCT Pub. No.: WO94/14649

PCT Pub. Date: Jul. 7, 1994

[30] Foreign Application Priority Data

Dec. 22, 1992 [FI] Finland ................................ 925829

[51] Int. Cl.⁶ ........................................ B60L 11/02
[52] U.S. Cl. ............................ 440/6; 440/81
[58] Field of Search ........................ 440/1, 2, 3, 6, 440/7, 80, 81

[56] References Cited

U.S. PATENT DOCUMENTS 5,078,628  1/1992  Garis ................................ 440/6

FOREIGN PATENT DOCUMENTS

| 1932929 | 2/1971 | Germany. |
| 3207398 | 3/1986 | Germany. |
| 375498 | 4/1975 | Sweden. |
| 388580 | 10/1976 | Sweden. |
| 469199 | 4/1975 | U.S.S.R.. |

OTHER PUBLICATIONS

Derwent Abstract B7354X/08, Abstract of SU-A-469199, dated Apr. 30, 1975.
Derwent Abstract 93-034757/04, Abstract of SU-A1-1717478, dated Mar. 7, 1992.

*Primary Examiner*—Stephen Avila
*Attorney, Agent, or Firm*—Watson Cole Stevens Davis, P.L.L.C.

[57] ABSTRACT

The invention relates to a propeller drive system for a vessel or the like for operating two contra-rotating propellers (1,2) disposed on two coaxial shafts (3,4) in succession. The power supplies of two electric motors (5,6) rotating the propellers (1,2) comprise a first and second frequency converter (7,8) and their control unit comprises means for controlling the frequency converters (7,8) so that the direction of rotation of the motors (5,6) and their rotational speed from zero up to the nominal speed can be chosen freely.

4 Claims, 2 Drawing Sheets

PROPELLER DRIVE SYSTEM

The present invention relates to a propeller drive system for a vessel or the like, which system comprises

- a first electric motor, connected to a shaft on which a first rotor and a first propeller are disposed,
- a second electric motor, connected to a hollow shaft on which a second rotor and a second propeller are disposed, whereby the first and second electric motor are arranged in succession and the shaft of the first motor runs coaxially through the rotor of the second motor and through the associated hollow shaft, the first and second propeller being arranged in succession,
- a first and second power supply for feeding electric power to the first and second motor, respectively, and
- a control unit for controlling the first and second power supply and through them the first and second electric motor to rotate the motors either in the same direction or in opposite directions.

As is known, instead of using one conventional propeller, by using two propellers arranged in succession to rotate around the same central shaft in opposite directions, the operating efficiency of the propeller can be considerably improved. By using such a double propeller it is possible to achieve savings of about 10–20% in the fuel costs for the ship. The prime movers used in the prior art double propeller drive systems are conventional ship prime movers, which are designed to rotate only one shaft. However, a gear, typically a planetary gear, has been disposed near the propeller inside the hull of the ship, and this gear distributes the power on two coaxial, contra-rotating shafts. The planetary gear also functions as a speed reducer which makes the rotational speed of the prime mover suitable for the propellers. Consequently, the directions of rotation and the rotational speeds between the propellers are determined by the settings of the planetary gear, and they cannot be changed during operation. Furthermore, one problem with such a propeller drive system is the fact that if the prime mover or gear is damaged, the consequence is often a situation in which neither of the propellers can be used any more.

A propeller drive system like the one described above in the introductory paragraph for a vessel or the like for operating two contra-rotating propellers disposed in succession on two coaxial shafts is known from German Offenlegungsschrift 19 32 929. In that system the rotational speed of the motors is controlled partly by changing the rotational speed of the generators functioning as power supplies for the drive system by adjusting the rotational speed of the diesel engines rotating the generators and partly by means of a speed controller. Diesel drive enables adjustment of the rotational speed in the range of 100% to 30%. In this situation, when the rotational speed of the diesel engine is at the lowest, it is possible to adjust the rotational speed of the second motor by means of the speed controller down to zero and also make it rotate in the same direction as the second propeller. In this prior art arrangement, a prerequisite for speed adjustment is that the power supply of the motors is a combination of a diesel engine and a generator. In addition, the range of rotational speed variation is not quite sufficient and does not enable independent running and speed adjustment of the motors, which can be regarded as the most essential shortcoming of the solution in question. With regard to the operational safety of ships, it would be most desirable that each motor could be used independently.

The object of the present invention is to provide a propeller drive system whereby the propellers of a double propeller can be used substantially independently of each other in such a way that they can be given the desired direction of rotation and rotational speed entirely independently of each other. This also enables a situation in which either of the propellers can be used alone.

A propeller drive system in accordance with the invention, by which the above mentioned object is achieved, is characterized in that the first and second power supply comprise a first and second frequency converter, and that the control unit comprises means for controlling the frequency converters so that the direction of rotation of the motors and their rotational speed from zero up to the nominal speed can be chosen freely.

In the system in accordance with the invention the solution is that each of the two propellers has in fact its own prime mover, i.e. its own electric motor, and as these electric motors are supplied by their own frequency converters, the rotational speed as well as the direction of rotation of the motors can be chosen freely. Furthermore, a double-motor solution like this provides a possibility to use either of the motors alone. Consequently, if one of the motors is damaged, the other propeller can still be rotated in the desired direction at the desired speed. Preferably the means in the control unit for controlling the frequency converters also comprise means for electrically preventing the rotation of the propellers independently of each other. Thereby it is possible to lock the motors electrically in place and thus to prevent the rotation of each propeller by the impact of the other propeller or the flow of water created by the movement of the ship. This locking option is useful particularly in different damage conditions.

Preferably in the system according to the invention the first and second electric motor have a common housing. In this way the double motor can be made a compact unit, which does not need much more space than one motor. Therefore it is further preferred that the shaft of the first motor is supported by a bearing against the rotor of the second motor via a contra-rotating bearing.

The propeller drive system in accordance with the invention differs substantially from a conventional propeller drive system using a planetary gear, as well as from the prior art diesel-electric double-motor system. Compared with such propeller drive systems, the advantages of the system in accordance with the invention include the following significant features:

- owing to an inverter drive, the speed and direction of rotation of both propellers can be chosen freely and varied steplessly from zero to the nominal speed;
- in all load conditions the mutual rotational speed of the propellers can be chosen to be such that the best efficiency or propulsive force is achieved;
- the system does not use a planetary gear or other reduction gear to vary the speed in different directions or to change the rotational speed of the prime mover to suit the propellers, in other words, the system is entirely gearless;
- if required, the system can be operated with only one propeller, i.e. either of the propellers.

Figure 2:
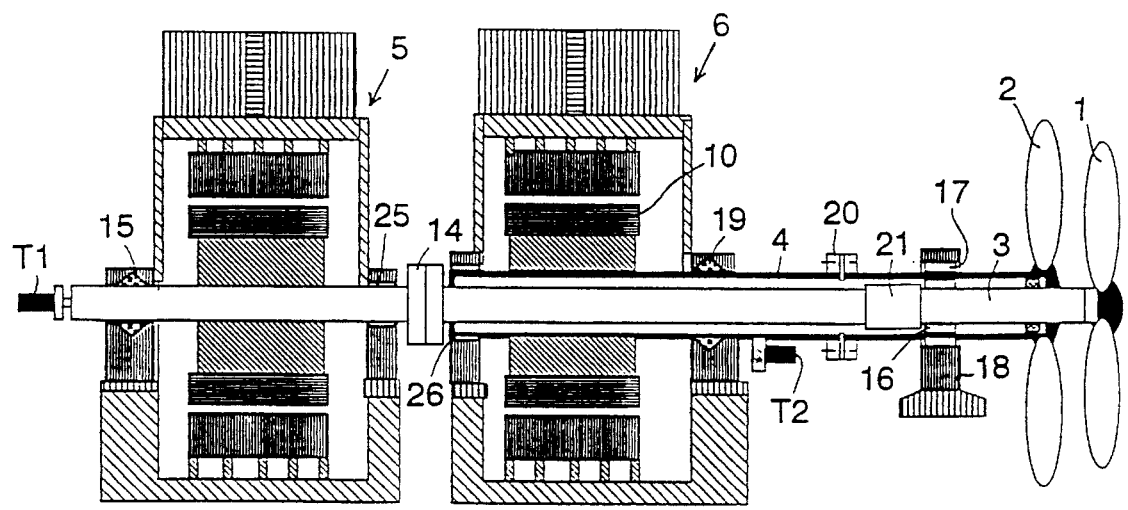
Figure 3:
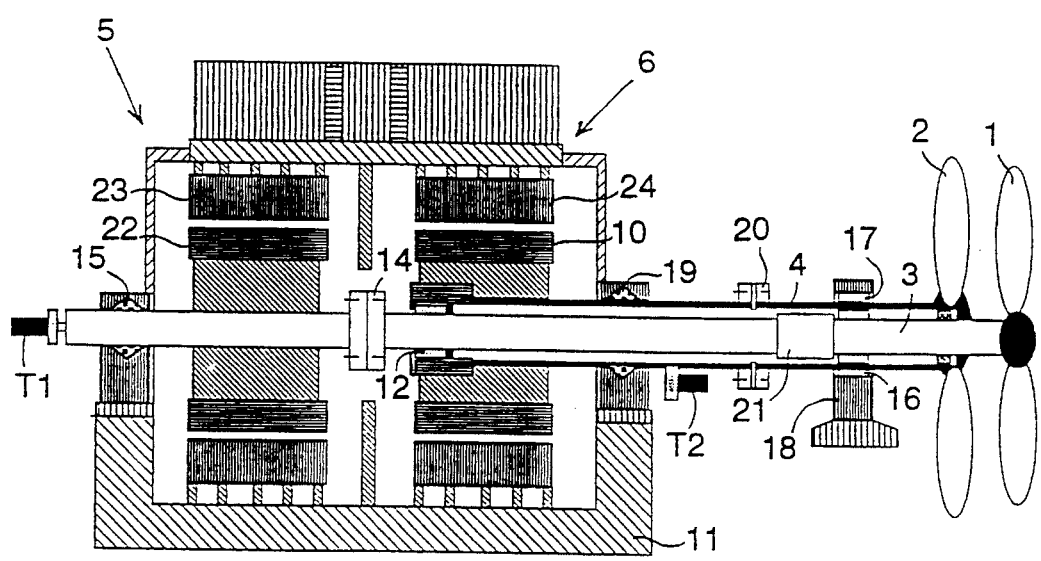

In the following the propeller drive system according to the invention will be described in greater detail with reference to the accompanying drawing, in which FIG. 1 is a schematic view of the construction of a propeller drive system in accordance with the invention, FIG. 2 shows a first exemplary embodiment of a motor as part of the propeller drive system in accordance with the invention and FIG. 3 shows another exemplary embodiment of a motor as part of the propeller drive system in accordance with the invention.

FIG. 1 shows a schematic block diagram of the propeller drive system in accordance with the invention. This propeller drive system comprises a first and second propeller 1 and 2, which are arranged in succession and rotate coaxially. Propellers 1 and 2 are rotated by shafts 3 and 4, respectively, shaft 4 being hollow and coaxial with shaft 3. These shafts 3 and 4 are rotated in turn by electric motors 5 and 6. The shaft of motor 5 runs through the rotor of motor 6 in order to make its shaft 3 coaxial with the shaft 4 of motor 6. The rotational speed of motors 5 and 6 is monitored by tachometers T1 and T2. Motors 5 and 6 are fed from the power supply mains N, which can be created for example diesel-electrically, through inverters 7 and 8. By means of said inverters, the direction and speed of rotation of motors 5 and 6 can be freely chosen between zero and the nominal speed. The inverters 7 and 8 are controlled by a control unit 9, which receives information on the rotational speed of motors 5 and 6 from tachometers T1 and T2. The control unit 9 can optimize the mutual speeds and directions of rotation of motors 5 and 6 to suit each mode of operation. Information on the desired mode is given to the control unit 9 from the control means 13 connected with the control unit 9.

The propeller drive system in accordance with the invention provides a very good control of different damage conditions. If for example the bearings of either shaft are damaged, the shaft supported by the damaged bearing can either be locked in place electrically or its rotational speed can be restricted. The electrical locking also enables easy realization of mechanical locking. One of the shafts, if its bearings are undamaged, can be rotated at the desired speed in the desired direction. If the contra-rotating bearing, against which both shafts are supported, is damaged, the difference in rotational speeds between the shafts can be adjusted to be such that the bearings can still function. In this case it is also possible to use a procedure in which the shafts are locked electrically to rotate at the same speed in the same direction. The shafts can also be locked mechanically to rotate together. The construction and dimensioning of this mechanical locking is made considerably easier by the fact that the rotation of both motors can be adjusted independently of each other. In addition, if the frequency converter or the control system of either motor is defective, one motor can still be rotated at the desired speed in the desired direction, and the shaft of the other motor can be allowed to rotate freely with it (by the impact of its propeller) or it can be locked in place mechanically.

FIG. 2 shows the mutual coupling of motors 5 and 6 included in the propeller drive system in accordance with the invention in a case where the motors are two separate electric motors 5 and 6. In this case, shaft 3 of motor 5 runs after a flange joint 14 through rotor 10 of motor 6 coaxially with this rotor 10 and the associated hollow shaft 4. The rotation of shaft 3 is monitored by means of a tachometer T1 disposed at the opposite end with respect to propeller 1. The rotation of shaft 4 is in turn monitored by means of a tachometer T2, which is disposed to follow the outer surface of shaft 4 on the portion of shaft 4 between motor 6 and propeller 2 relatively close to motor 6.

As shown in FIG. 2, shaft 3 is supported by a bearing 15 which is close to the end opposite to propeller 1 and which also receives the axial power of propeller 1. Shaft 3 is further supported by a bearing 25 at the point where shaft 3 comes out from motor 5, and also by a bearing 16 close to the other end of the shaft. Bearing 16 is then supported by the inner surface of shaft 4. At the corresponding point shaft 4 has a bearing 17, which is supported by a suitable bearing block 18. Shaft 4 is supported by a further bearing 19 which also receives the axial power of propeller 2 and which is disposed at the point where shaft 4 comes out from motor 6. At the end opposite to propeller 2 shaft 4 is supported by a bearing 26.

For detaching propellers 1 and 2 during maintenance and for disconnecting shafts 3 and 4, a flange joint 20 is provided on the portion of the shafts between bearing block 18 and motor 6 for disconnecting the hollow shaft 4 and a coupling 21 for disconnecting shaft 3. This coupling 21 can be for example a mechanical compression coupling which can be detached by means of pressurized fluid.

FIG. 3 shows another embodiment of a motor which can be used in the propeller drive system in accordance with the invention. This motor is a kind of double motor, which has double rotors and stators within the same housing 11. In this case electric motor 5 comprises rotor 22 and stator 23 and motor 6 comprises rotor 11 and stator 24. Except for the double construction of the motor, the construction shown in FIG. 3 otherwise corresponds with the construction shown in FIG. 2, and thus its corresponding parts have also the same numbers as in the embodiment shown in FIG. 2.

In the double motor shown in FIG. 3, shaft 3 of the first motor 5 is supported by a bearing block 15 which is close to the shaft end opposite to propeller 1 and which also receives the axial power of propeller 1. The shaft is further supported by a bearing 12 relative to rotor 10 of the second motor 6, and also by a bearing 16 close to propeller 1 on the inner surface of shaft 4 of motor 6. The end of shaft 4 opposite to propeller 2 is also supported against shaft 3 by bearing 12. In addition, shaft 4 is supported by a bearing 19 at the point where it comes out from motor 6, and this bearing also receives the axial power of propeller 2, and in the same way as in the embodiment shown in FIG. 2, shaft 4 has a bearing 17 supported by a bearing block 18 at the point where shaft 3 is supported against the inner surface of shaft 4 by a bearing 16. As appears from the above description, the use of double motors enables efficient and uniform support of the shafts for their whole length and also a compact construction of the motor. Owing to a common housing, the double motor also becomes a little lighter than two separate motors.

In the above, the propeller drive system in accordance with the invention is described only by means of two exemplary embodiments, and it is to be understood that several structural changes can be made to it, especially with regard to the control system of the electric motors and their mechanical construction, such as the bearings and support of the shafts and the disposition and construction of different couplings or flange joints, without departing from the scope defined by the attached claims.

I claim:

1. A propeller drive system for a vessel or the like, which system comprises a first electric motor connected to a shaft on which a first rotor and a first propeller are disposed, a second electric motor connected to a hollow shaft on which a second rotor and a second propeller are disposed, whereby the first and second electric motors are arranged in succession and the shaft of the first motor runs coaxially through the rotor of the second motor and through the associated hollow shaft, the first and second propellers being arranged in succession, a first power supply and second power supply for feeding electric power to the first and second motors, respectively, and a control unit for controlling the first and second power supplies and through them the first and second electric motors to rotate the motors either in the same direction or in opposite directions, wherein the first and second power supplies comprise first and second frequency converters, the control unit comprises means for controlling the frequency converters so that the direction of rotation of the motors and their rotational speed from zero up to nominal speed can be chosen so that the motors can be driven independently of each other, and the means in the control unit for controlling the frequency converters comprise means for electrically preventing the rotation of the propellers independently of each other.

2. A propeller drive system in accordance with claim 1, wherein the first and second electric motors have a common housing.

3. A propeller drive system in accordance with claim 2, wherein the shaft of the first motor is supported by a bearing against the rotor of the second motor.

4. A propeller drive system for a vessel or the like, which system comprises a first electric motor connected to a shaft on which a first rotor and a first propeller are disposed, a second electric motor connected to a hollow shaft on which a second rotor and a second propeller are disposed, whereby the first and second electric motors are arranged in succession and the shaft of the first motor runs coaxially through the rotor of the second motor and through the associated hollow shaft, the first and second propellers being arranged in succession, a first and second power supply for feeding electric power to the first and second motors, respectively, and a control unit for controlling the first and second power supplies and through them the first and second electric motors to rotate the motors either in the same direction or in opposite directions, wherein the first and second power supplies comprise a first and second frequency converter, the control unit comprises means for controlling the frequency converters so that the direction of rotation of the motors and their rotational speed from zero up to a nominal speed can be chosen so that the motors can be driven independently of each other, the first and second electric motors have a common housing, and the shaft of the first motor is supported by a bearing against the rotor of the second motor.

* * * * *